(12) United States Patent
Mani (10) Patent No.: US 11,668,073 B2
(45) Date of Patent: Jun. 6, 2023

(54) TUBING ASSEMBLY FOR A WORK VEHICLE

(71) Applicant: CNH Industrial America LLC, New Holland, PA (US)

(72) Inventor: Murali Sankar Mani, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 730 days.

(21) Appl. No.: 16/254,237

(22) Filed: Jan. 22, 2019

(65) Prior Publication Data

US 2020/0232187 A1 Jul. 23, 2020

(51) Int. Cl.
| | |
|---|---|
| *E02F 3/34* | (2006.01) |
| *E02F 9/22* | (2006.01) |
| *F16L 11/00* | (2006.01) |
| *B60R 16/08* | (2006.01) |

(52) U.S. Cl.
CPC ............ *E02F 9/2275* (2013.01); *B60R 16/08* (2013.01); *E02F 3/3414* (2013.01); *F16L 11/00* (2013.01)

(58) Field of Classification Search
CPC .................................................. E02F 3/3414
See application file for complete search history.

(56) References Cited

U.S. PATENT DOCUMENTS

| | | | |
|---|---|---|---|
| 3,872,881 A * | 3/1975 | Miller | E02F 9/2275 280/421 |
| 5,232,330 A | 8/1993 | Rae et al. | |
| 6,224,593 B1 * | 5/2001 | Ryan | A61B 18/1815 606/41 |
| 6,758,024 B1 * | 7/2004 | Mieger | E02F 3/38 52/839 |
| 6,994,511 B2 | 2/2006 | Westendorf et al. | |
| 6,994,512 B2 | 2/2006 | Stender et al. | |
| 8,047,760 B2 | 11/2011 | Roan et al. | |
| 8,246,286 B2 | 8/2012 | Fukudome et al. | |
| 8,821,104 B2 * | 9/2014 | Yasuda | E02F 9/0816 414/685 |
| 9,617,706 B2 | 4/2017 | Takemura et al. | |
| 10,308,108 B2 * | 6/2019 | Honda | B60K 13/04 |
| 2016/0288845 A1 * | 10/2016 | Honda | E02F 9/0883 |

FOREIGN PATENT DOCUMENTS

| | | |
|---|---|---|
| JP | 4705056 B2 | 6/2011 |
| KR | 20160054108 A * | 5/2016 |

* cited by examiner

*Primary Examiner* — Michael S Lowe
(74) *Attorney, Agent, or Firm* — Peter K. Zacharias (57) ABSTRACT

A tubing assembly for a work vehicle includes a tube having a first end and a second end, wherein the first end is configured to fluidly couple to a fluid source. The tubing assembly also includes a fitting positioned at the second end of the tube. The fitting includes a first radially-expanded portion configured to engage a first side of a plate that is configured to form part of a chassis of the work vehicle, a threaded portion configured to extend through an opening in the plate, and a second radially-expanded portion configured to engage a second side of the plate to trap the plate between the first radially-expanded portion and the second radially-expanded portion, thereby coupling the tube to the plate.

17 Claims, 7 Drawing Sheets

TUBING ASSEMBLY FOR A WORK VEHICLE

BACKGROUND

The present disclosure relates generally to a tubing assembly for a work vehicle, particularly for a skid steer and similar work vehicles.

Work vehicles, such as skid steers and similar work vehicles, are increasingly being used at worksites (e.g., construction sites, agricultural fields). For example, skid steers are typically used as general utility machines due to their versatility and ability to operate at worksites having limited surface area. Some work vehicles may include a hydraulic system that is used to control various attached implements, such as a blade or bucket. However, certain components of the hydraulic system may interfere with and/or crowd other components of the work vehicle.

BRIEF DESCRIPTION

Certain embodiments commensurate in scope with the present disclosure are summarized below. These embodiments are not intended to limit the scope of the claims, but rather these embodiments are intended only to provide a brief summary of possible forms of the system and/or methods disclosed herein. Indeed, the systems and/or methods may encompass a variety of forms that may be similar to or different from the embodiments set forth below.

A first embodiment includes a tubing assembly for a work vehicle. The tubing assembly includes a tube having a first end and a second end, wherein the first end is configured to fluidly couple to a fluid source. The tubing assembly also includes a fitting positioned at the second end of the tube. The fitting includes a first radially-expanded portion configured to engage a first side of a plate that is configured to form part of a chassis of the work vehicle, a threaded portion configured to extend through an opening in the plate, and a second radially-expanded portion configured to engage a second side of the plate to trap the plate between the first radially-expanded portion and the second radially-expanded portion, thereby coupling the tube to the plate.

A second embodiment includes a work vehicle having a tubing assembly configured to provide a fluid from a fluid source to an actuator. The tubing assembly includes a tube having a first end and a second end, wherein the first end is configured to fluidly couple to the fluid source. The tubing assembly also includes a fitting positioned at the second end of the tube, wherein the fitting comprises a first radially-expanded portion in engagement with a first side of a plate of a chassis of the work vehicle, a threaded portion extending through an opening in the plate, and a second radially-expanded portion in engagement with a second side of the plate, such that the plate is trapped between the first radially-expanded portion and the second radially-expanded portion to couple the tube to the plate.

A third embodiment includes a work vehicle having a chassis with a tower portion, an arm configured to couple to an implement, and a tubing assembly configured to provide a fluid from a fluid source to an actuator to adjust a position of the arm, the implement, or both. The tubing assembly includes a tube having a first end and a second end, wherein the first end is configured to fluidly couple to the fluid source. The tubing assembly also includes a fitting positioned at the second end of the tube, and the fitting is in engagement with a rearwardly-facing plate of the tower portion of the chassis to block movement of the tube relative to the rearwardly-facing plate of the tower portion of the chassis. The fitting includes comprises a threaded portion that extends through an opening in the rearwardly-facing plate to facilitate fluidly coupling the tube to a hose.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Work vehicles, such as skid steers and similar work vehicles (e.g., front loaders), may move about and carry out operations at a worksite (e.g., construction site, agricultural field). For example, work vehicles may move about a construction site to dig trenches, level ground, move objects, or the like. Some work vehicles may include a hydraulic system that is used to control various attached implements, such as a blade or bucket. However, components (e.g., tubing) of the hydraulic system may interfere with and/or crowd other components of the work vehicle. Accordingly, the disclosed embodiments relate to a tubing assembly that may be used as part of a hydraulic system of a work vehicle. The tubing assembly disclosed herein may be arranged within the work vehicle in a manner that avoids other components (e.g., motor, electrical system, cooling system) of the work vehicle, provides more space for these other components of the work vehicle, and/or reduces wear on components (e.g., tubing, hoses) of the tubing assembly, for example.

To facilitate clarity, the present disclosure is described primarily in relation to skid steers. However, it should be appreciated the tubing assembly and other elements described in the present disclosure are not limited to use with skids steers. In fact, the tubing assembly may be implemented in any of a variety of other work vehicles (e.g., front loaders, bull dozers, tractors) that include a hydraulic system and hydraulically-operated implements.

Figure 1:
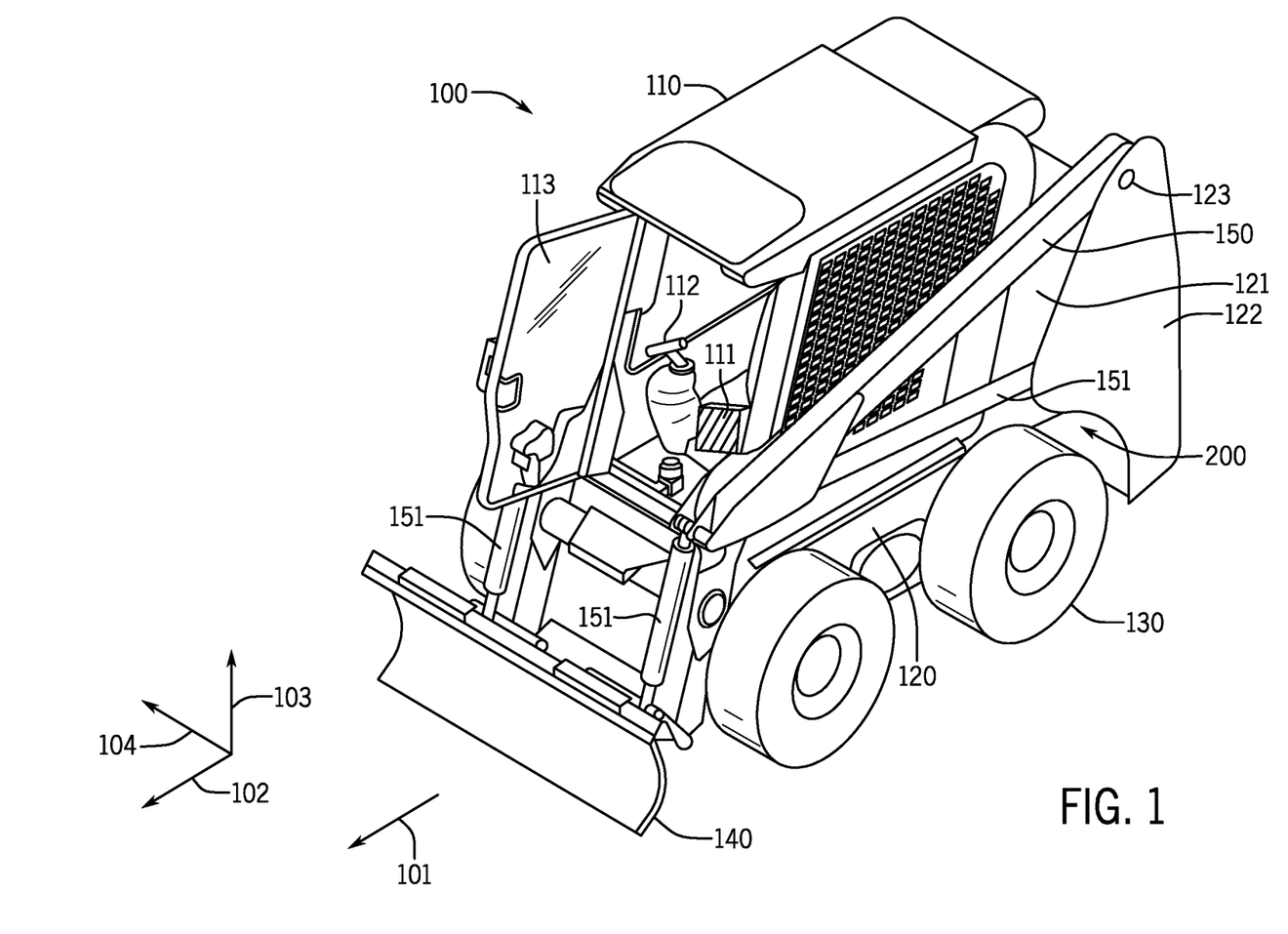
FIG. 1 is a front perspective view of a work vehicle, in accordance with an embodiment of the present disclosure.

Turning now to the figures, FIG. 1 is a front perspective view of an embodiment of a work vehicle 100. In the illustrated embodiment, the work vehicle 100 is a skid steer. However, as noted above, it should be appreciated that the work vehicle 100 disclosed herein may be any type of work vehicle, such as but not limited to front loaders, bull dozers, tractors, or the like. To facilitate discussion, the work vehicle 100 and its components may be described with reference to a forward direction of travel 101, a longitudinal axis or direction 102, a vertical axis or direction 103, and a lateral axis or direction 104.

In the illustrated embodiment, the work vehicle 100 includes a cab 110 and a chassis 120 (e.g., frame). The cab 110 and the chassis 120 are supported on wheels 130, although it should be appreciated that the work vehicle 100 may include tracks instead of or in addition to the wheels 130. Additionally, the work vehicle 100 includes an attachment tool 140 (e.g., implement), which is coupled to and supported by arms 150 (e.g., the illustrated left-side loader arm and a right-side loader arm, which are mounted on opposite lateral sides of the work vehicle 100). The chassis 120 of the work vehicle 100 includes a tower portion 121 positioned rearward of the cab 110 relative to the direction of travel 101 and positioned between the arms 150 along the lateral axis 104. Thus, each of the arms 150 is positioned laterally-outward of the tower portion 121 and extends forward of the tower portion 121 relative to the direction of travel 101 to couple to the attachment tool 140. The arms 150 may be rotatably supported on the tower portion 121 and/or on a respective laterally-outer plate 122 (e.g., via one or more hinges, such as hinge 123). The arms 150 may include or be coupled to actuators 151 (e.g., hydraulic cylinders), which may be part of a hydraulic system 200 and which may be adjusted via a flow of fluid (e.g., hydraulic fluid) to drive movement of the attachment tool 140. Various other actuators 151 may be provided to drive different movements of the arms 150 and/or the attachment tool 140. While the illustrated attachment tool 140 is a blade, it should be appreciated that the work vehicle 100 may be coupled to various other attachment tools 140, such as a bucket, a ripper assembly, a tilling assembly, or a gripper assembly, among other attachments.

The cab 110 is configured to house an operator of the work vehicle 100. Accordingly, the work vehicle 100 may include an operator interface 111 (e.g., having a display, speaker, and/or inputs, such as buttons or switches) positioned within the cab 110 to provide information to the operator and/or to facilitate operator control of the work vehicle 100. In some embodiments, various other inputs, such as the illustrated joystick 112, may be positioned within the cab 110 to facilitate operator control of the work vehicle 100. For example, the inputs may enable the operator to control rotational speed of the wheels 130, thereby facilitating adjustment of the speed and/or direction of the work vehicle 100. As shown, in some embodiments, a front windshield 113 may move between an open position and closed position. Furthermore, in some embodiments, the work vehicle 100 may be an autonomous vehicle and may be fully or partially controlled by a control system and/or an operator located remotely from the work vehicle 100.

In certain embodiments, the chassis 120 (e.g., the tower portion 121 of the chassis 120) is configured to house or support at least some components of the hydraulic system 200, which may include at least a tubing assembly, a pump, a valve or other flow control element, and a tank. The chassis 120 (e.g., the tower portion 121 of the chassis 120) may also house or support a motor (e.g., diesel engine, etc.) and other components (e.g., an electrical system, a cooling system) that facilitate operation of the work vehicle 100. As discussed in more detail below, the tubing assembly of the hydraulic system 200 may include features that provide various advantages. For example, the tubing assembly may be arranged within the work vehicle 100 in a manner that avoids other components (e.g., the motor, the electrical system, the cooling system) of the work vehicle 100, provides more space for these other components of the work vehicle 100, and/or reduces wear on components (e.g., tubing, hoses) of the tubing assembly.

Figure 2A:
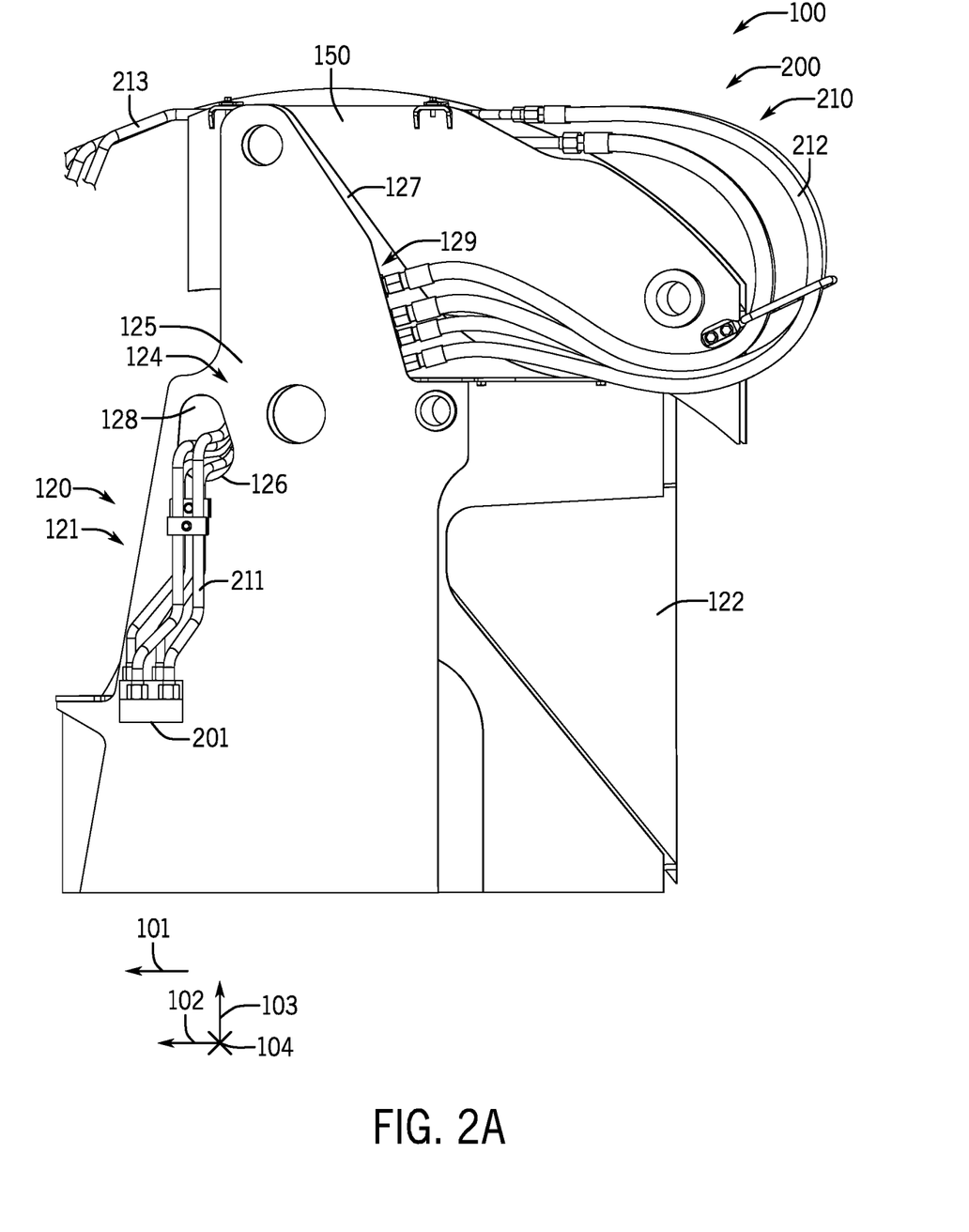
FIG. 2A is a side view of a portion of the work vehicle having a hydraulic system with a tubing assembly, in accordance with an embodiment of the present disclosure.
Figure 2B:
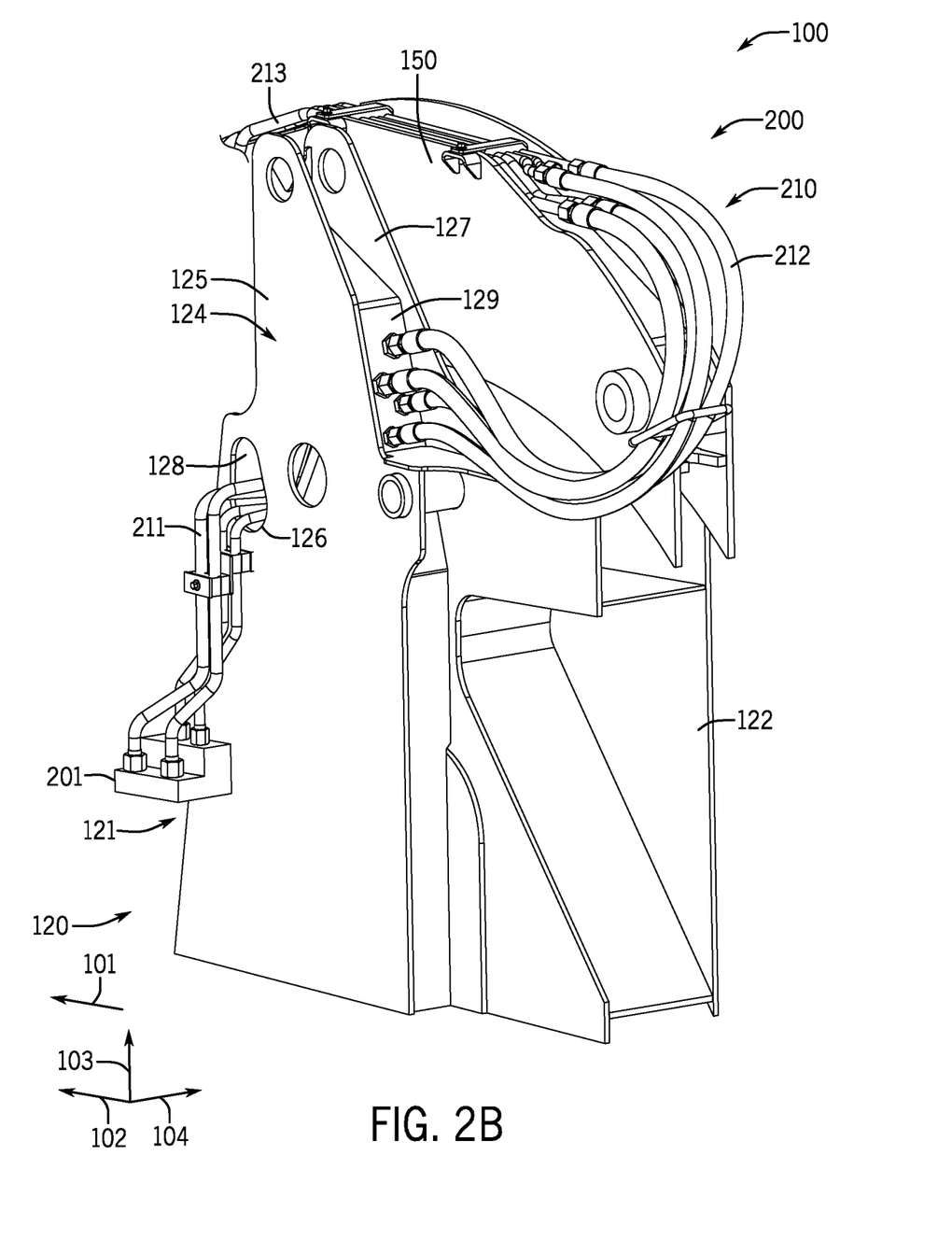
FIG. 2B is a rear perspective view of the portion of the work vehicle of FIG. 2A, in accordance with an embodiment of the present disclosure.
Figure 2C:
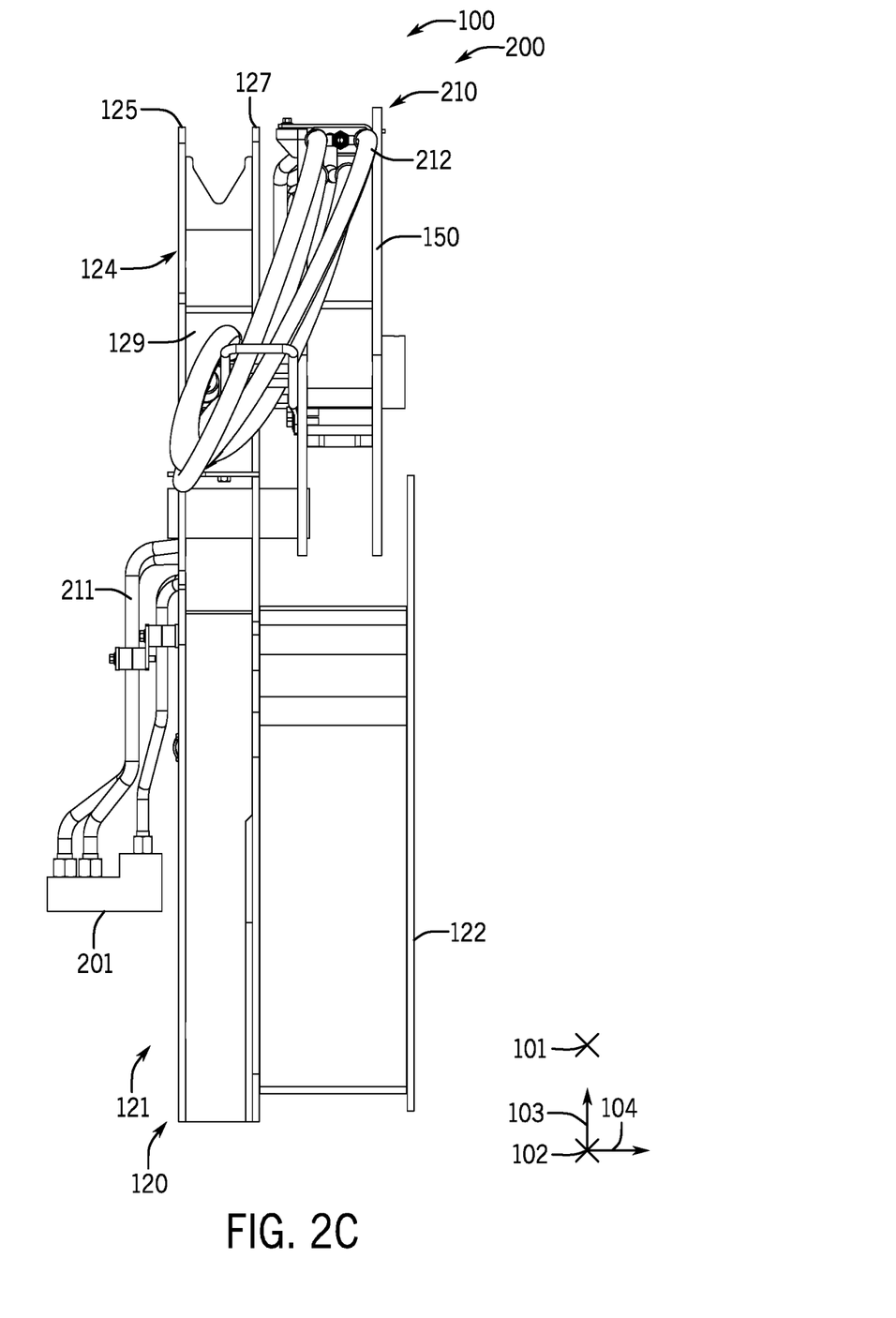
FIG. 2C is a rear view of the portion of the work vehicle of FIG. 2A, in accordance with an embodiment of the present disclosure.

FIG. 2A is a side-view of a portion of the work vehicle 100 and the hydraulic system 200, FIG. 2B is a rear perspective view of the portion of the work vehicle 100 and the hydraulic system 200, and FIG. 2C is a rear view of the portion of the work vehicle 100 and the hydraulic system 200. The illustrated portion includes certain components of the hydraulic system 200 located on a right-side of the work vehicle 100, and it should be appreciated that similar components may be located on a left-side of the work vehicle 100. As shown, the hydraulic system 200 includes a fluid source 201, which may include a tank and/or a flow control element (e.g., valve) positioned within the tower portion 121 of the chassis 120. The hydraulic system 200 also includes a tubing assembly 210 that is configured to deliver fluid from the fluid source 201 to the actuators 151 shown in FIG. 1 to adjust the arms 150 and/or to operate the attachment tool 140 shown in FIG. 1. The fluid source 201 is illustrated schematically to simplify the drawings.

The tubing assembly 210 may include multiple tubes 211 (e.g., inflexible, rigid tubes) that extend (e.g., vertically) from the fluid source 201 along a laterally-inner side 124 of a laterally-inner plate 125 (e.g., structural plate) of the tower portion 121 of the chassis 120 of the work vehicle 100. The multiple tubes 211 may be bent (e.g., curved) to extend laterally-outwardly to enable the multiple tubes 211 to pass through an opening 126 defined in the laterally-inner plate 125. Thus, each of the multiple tubes 211 includes a portion that is positioned in a space 128 (e.g., lateral gap) defined between the laterally-inner plate 125 and a laterally-outer plate 127 (e.g., structural plate) of the tower portion 121 of the chassis 120. The multiple tubes 211 may exit from the space 128 via openings defined in a rearward-facing plate 129 of the tower portion 121 of the chassis 120 to enable the multiple tubes 211 to couple to hoses 212 (e.g., flexible hoses) that bend to couple to arm-mounted tubes 213 (e.g., inflexible, rigid tubes) that extend along the arm 150 to deliver the fluid to the actuators 151 shown in FIG. 1. While the illustrated tubes 211, 213 are inflexible, rigid tubes, it should be appreciated that the tubes 211 and/or the tubes 213 may be flexible. Additionally, the terms "tube" and "hose" may be used interchangeably herein to refer to inflexible or flexible annular conduits. Furthermore, at least the laterally-inner plate 125, the opening 126, the laterally-outer plate 127, the space 128, the rearward-facing plate 129, and/or the arm 150 may be configured in a particular manner to accommodate the tubes 211, the hoses 212, and the arm-mounted tubes 213. Thus, for the purposes of the present disclosure, at least the laterally-inner plate 125, the opening 126, the laterally-outer plate 127, the space 128, the rearward-facing plate 129, and/or the arm 150 may also be considered part of the tubing assembly 210.

The illustrated arrangement of the multiple tubes 211 may block the multiple tubes 211 from interfering with other components (e.g., the motor, the electrical system, the cooling system) that are housed within the tower portion 121 of the chassis 120. Furthermore, this arrangement may provide more space for these other components within the tower portion 121 and/or may reduce wear on the tubes 211 and/or the hoses 212 (e.g., because the hoses 212 bend in a wide u-shape to extend from the tubes 211 to the arm-mounted tubes 213), for example. It should be appreciated that while four tubes 211, four hoses 212, and four arm-mounted tubes 213 are illustrated, the tubing assembly 210 may include any suitable number (e.g., 1, 2, 3, 4, 5, 6, 7, 8, or more) of these components.

Figure 3A:
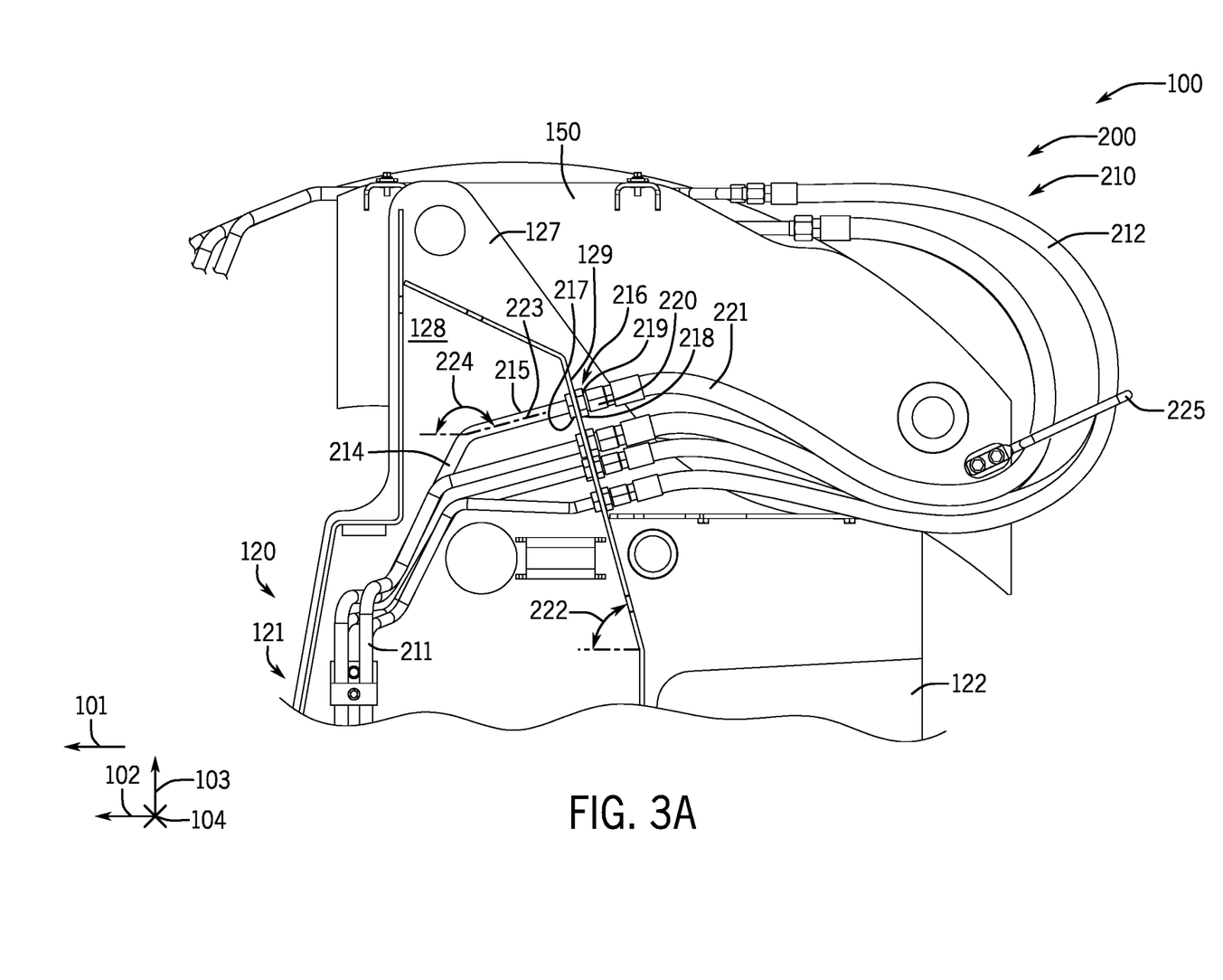
FIG. 3A is a side view of a portion of the work vehicle with a laterally-inner plate of a tower portion of a chassis of the work vehicle removed to reveal components of the tubing assembly, in accordance with an embodiment of the present disclosure.
Figure 3B:
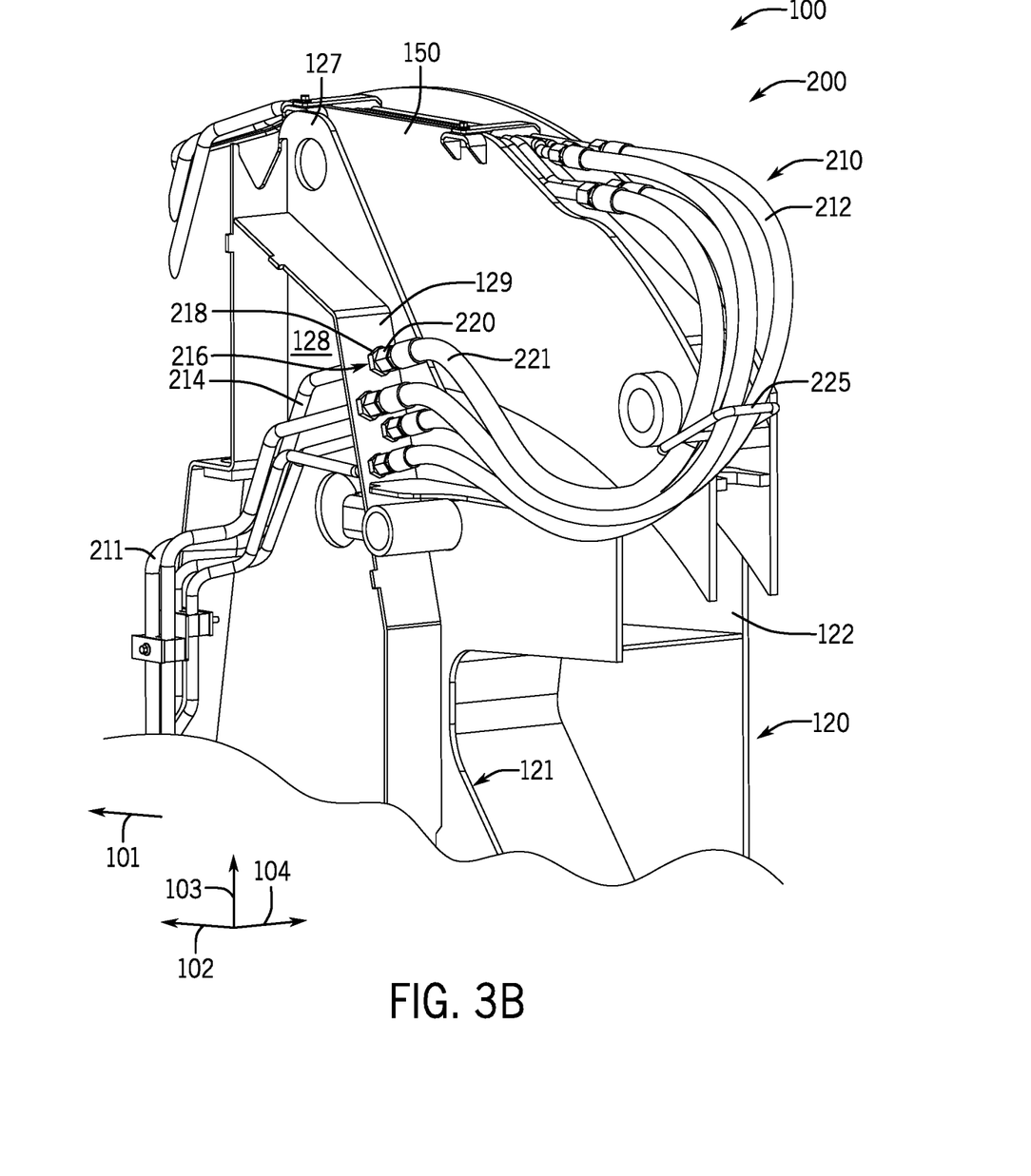
FIG. 3B is a rear perspective view of the portion of the work vehicle of FIG. 3A, in accordance with an embodiment of the present disclosure.

FIG. 3A is a side view of a portion of the work vehicle 100 with the laterally-inner plate 125 (shown in FIGS. 2A-2C) of the tower portion 121 of the chassis 120 removed to illustrate various elements of the tubing assembly 210. Similarly, FIG. 3B is a rear-perspective view of the portion of the work vehicle 100 with the laterally-inner plate 125 of the tower portion 121 of the chassis 120 removed to illustrate various elements of the tubing assembly 210.

With the laterally-inner plate 125 of the tower portion 121 removed, portions 214 of the tubes 211 positioned within the space 128 are visible. As shown, each tube 211 includes an end 215 (e.g., end portion) that is coupled to a fitting 216 (e.g., bulkhead fitting or coupler). For example, the fitting 216 may be brazed (e.g., soldered) or otherwise fixed to the end 215 of the respective tube 211. The fitting 216 may include a first radially-expanded portion 217, a second radially-expanded portion 218, and a threaded portion 219. One or both of the radially-expanded portions 217, 218 may be a nut (e.g., threaded nut) that is threadably coupled to the threaded portion 219 of the fitting 216. The fitting 216 couples the tube 211 to the tower portion 121 of the chassis 120 and also couples the tube 211 to a respective hose 212. For example, the rearward-facing plate 129 of the tower portion 121 of the chassis 120 may be trapped between the radially-expanded portions 217, 218 to couple the tube 211 to the tower portion 121 of the chassis 120, and the threaded portion 219 of the fitting 216 extends rearward of the rearward-facing plate 129 relative to the direction of travel 101 to couple (e.g., threadably couple) to a coupler 220 (e.g., threaded coupler) positioned on an end 221 (e.g., end portion) of the respective hose 212.

The fitting 216 may facilitate efficient installation of the tubing assembly 210 within the work vehicle 100. For example, the tube 211 with the first radially-expanded portion 217 and the threaded portion 219 of the fitting 216 positioned at the end 215 of the tube 211 may be placed within the space 128 of the tower portion 121 of the chassis 120, and the threaded portion 219 may be inserted through the opening in the rearward-facing plate 129. The opening may be sized to enable the threaded portion 219 to pass through and extend rearward of the opening; however, the first radially-expanded portion 217 may be too large (e.g., in diameter) to pass through the opening and may engage an inner surface (e.g., forward-facing surface) of the rearward-facing plate 129. Subsequently, the second radially-expanded portion 218 (e.g., a threaded nut) may be threaded onto the end of the threaded portion 219 that extends rearward of the opening, and the second radially-expanded portion 218 may be tightened (e.g., rotated) until the second radially-expanded portion 218 contacts and engages the rearward-facing plate 129, thereby trapping the rearward-facing plate 129 between the radially-expanded portions 217, 218 and coupling the tube 211 to the tower portion 121 of the chassis 120. After coupling the tube 211 to the tower portion 121 of the chassis in this manner, the threaded portion 219 of the fitting 216 extends rearward of the rearward-facing plate 129 to couple to the coupler 220 positioned on the end 221 of the respective hose 212. It should be appreciated that the fitting 216 may alternatively be brazed or otherwise fixed to the end 221 of the respective hose 212, and that the coupler 220 may be positioned on the end 215 of the tube 211.

With reference to FIG. 3A, the portion of the rearward-facing plate 129 through which the tubes 211 pass may be oriented at an acute angle 222 (e.g., non-parallel, non-orthogonal) relative to the longitudinal axis 102. The acute angle 222 may be any suitable angle that alleviates stress on the interface between the tubes 211 and the hoses 212 and/or that enables the hoses 212 to bend in a wide u-shape at least while the arm 50 is in a default or resting position (e.g., lowered position) to fluidly couple the tubes 211 to the arm-mounted tubes 213. For example, the acute angle 222 may be between approximately 45 to 90, 50 to 85, 55 to 80, or 60 to 75 degrees. Due to this acute angle 222, a common axis 223 (e.g., central axis) of end 215 of the tube 211, the fitting 216, the coupler 220, and the end 221 of the hose 212 (e.g., when assembled and coupled to the rearward-facing plate 229) may also be oriented at an obtuse angle (e.g., non-parallel, non-orthogonal) relative to the longitudinal axis 102. For example, the obtuse angle 224 may be between approximately 135 to 180, 140 to 175, 145 to 170, or 140 to 165 degrees. Thus, the threaded portion 219 of the fitting 216 and the end 221 of the hose 212 extend rearwardly relative to the direction of travel 101 and also upwardly along the vertical axis 103 from the rearward-facing plate 129. Such a configuration may enable the hose 212 to bend in a wide u-shape to couple to the arm-mounted tube 213 and/or may generally alleviate stresses on the hose 212 during operation of the work vehicle 100. It should be appreciated that the tubing assembly 210 may include various other features, such as a bracket 225 that is coupled to the arm 50 and that wraps around the hoses 212.

Figure 4:
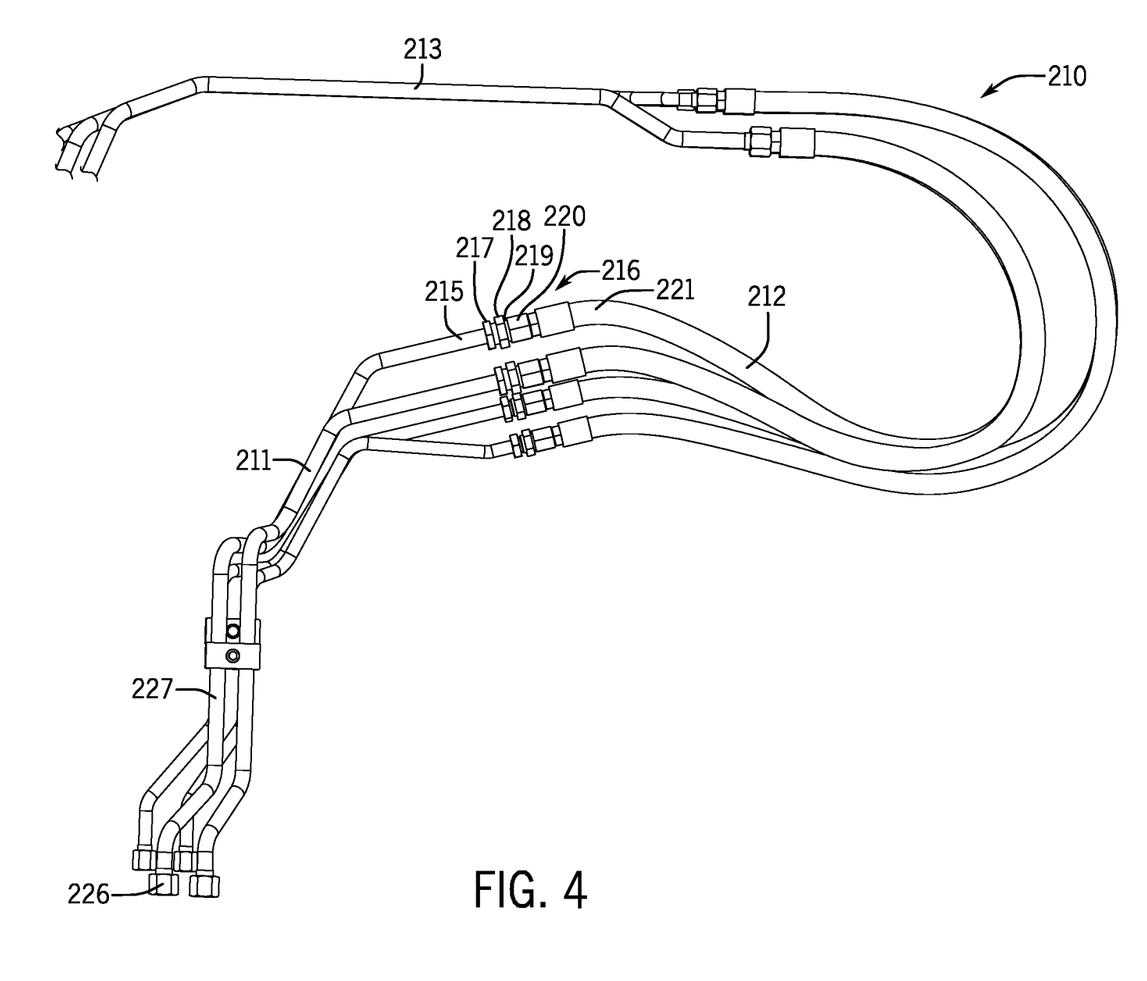
FIG. 4 is side view of a portion of the tubing assembly that may be used in the work vehicle of FIG. 1, in accordance with an embodiment of the present disclosure.

FIG. 4 is a side view of a portion of the tubing assembly 210 that may be used as part of the hydraulic system 200 of the work vehicle 100. As shown, the tubing assembly 210 includes the tubes 211, each having a coupler 226 (e.g., threaded coupler) at an end 227 (e.g., end portion) of the tube 211 to couple the tube 211 to the fluid source 201 shown in FIGS. 2A-2C and the fitting 216 at the end 215 of the tube 211 to couple the tube 211 to the rearward-facing plate 129 of the tower portion 121 of the chassis 120 shown in FIGS. 2A-3B. Each fitting 216 includes the radially-expanded portions 217, 218 and the threaded portion 219, which may couple to a respective coupler 220 at the end 221 of one of the hoses 212. The hoses 212 may bend in a wide u-shape to couple to the arm-mounted tubes 213, such as via one or more couplers 226 (e.g., threaded couplers).

The invention claimed is:

1. A tubing assembly for a work vehicle, comprising:
a rearwardly-facing plate that forms part of a chassis of the work vehicle;
a tube comprising a first end and a second end, wherein the first end is configured to fluidly couple to a fluid source housed in a tower portion of the chassis of the work vehicle that is positioned rearward of a cab of the work vehicle relative to a forward direction of travel of the work vehicle; and
a fitting positioned at the second end of the tube and configured to extend through an opening in the rearwardly-facing plate, wherein the fitting comprises a first radially-expanded portion configured to engage a first side of the rearwardly-facing plate, a threaded portion configured to extend rearwardly of the opening in the rearwardly-facing plate relative to the forward direction of travel of the work vehicle, and a second radially-expanded portion configured to engage a second side of the rearwardly-facing plate to trap the rearwardly-facing plate between the first radially-expanded portion and the second radially-expanded portion, thereby coupling the tube to the rearwardly-facing plate;
wherein the rearwardly-facing plate is oriented at an acute angle relative to a longitudinal axis of the work vehicle such that a central axis of the threaded portion of the fitting extends rearwardly relative to the forward direction of travel of the work vehicle and upwardly relative to a vertical axis of the work vehicle while the rearwardly-facing plate is trapped between the first radially-expanded portion and the second radially-expanded portion of the fitting.

2. The tubing assembly of claim 1, wherein the fitting is brazed onto the second end of the tube.

3. The tubing assembly of claim 1, wherein the second radially-expanded portion comprises a nut that is configured to be tightened about the threaded portion until the nut engages the second side of the rearwardly-facing plate to trap the rearwardly-facing plate.

4. The tubing assembly of claim 1, comprising:
a hose; and
a threaded coupler configured to couple to the threaded portion of the fitting and to a respective first end of the hose, thereby fluidly coupling the hose to the tube.

5. The tubing assembly of claim 4, comprising:
an arm-mounted tube configured to couple to an arm of the work vehicle; and
an additional threaded coupler configured to couple to a respective second end of the hose and a respective first end of the arm-mounted tube, thereby fluidly coupling the arm-mounted tube to the hose.

6. The tubing assembly of claim 1, comprising:
a laterally-inner plate comprising an additional opening; and
a laterally-outer plate, wherein a first portion of the tube extends along a laterally-inner side of the laterally-inner plate, a second portion of the tube bends laterally outwardly to pass through the additional opening, and a third portion of the tube extends through a space defined between the laterally-inner plate and the laterally-outer plate to enable the first end of the tube to fluidly couple to the fluid source and to enable the threaded portion of the fitting positioned at the second end of the tube to extend rearwardly of the opening in the rearwardly-facing plate.

7. A work vehicle, comprising:
a chassis comprising a plate oriented at an acute angle relative to a longitudinal axis of the work vehicle, wherein the plate is a rearwardly-facing plate;
a cab configured to house an operator;
a tower portion of the chassis positioned rearward of the cab relative to a forward direction of travel of the work vehicle, wherein the tower portion houses a fluid source; and
a tubing assembly configured to provide a fluid from the fluid source to an actuator, comprising:
a tube comprising a first end and a second end, wherein the first end is configured to fluidly couple to the fluid source; and
a fitting positioned at the second end of the tube and extending through an opening in the plate, wherein the fitting comprises a first radially-expanded portion in engagement with a first side of the plate, a threaded portion extending rearwardly of the opening in the plate relative to the forward direction of travel of the work vehicle, and a second radially-expanded portion in engagement with a second side of the plate, such that the plate is trapped between the first radially-expanded portion and the second radially-expanded portion to couple the tube to the plate;
wherein a central axis of the threaded portion of the fitting extends rearwardly relative to the forward direction of travel of the work vehicle and upwardly relative to a vertical axis of the work vehicle.

8. The work vehicle of claim 7, wherein the second radially-expanded portion comprises a nut that is configured to be tightened about the threaded portion until the nut is in engagement with the second side of the plate.

9. The work vehicle of claim 7, comprising:
a hose;
a threaded coupler coupled to the threaded portion of the fitting and to a respective first end of the hose, thereby fluidly coupling the hose to the tube;
an arm-mounted tube coupled to an arm of the work vehicle; and
an additional threaded coupler coupled to a respective second end of the hose and a respective first end of the arm-mounted tube, thereby fluidly coupling the arm-mounted tube to the hose.

10. The work vehicle of claim 7, comprising a laterally-inner plate comprising an additional opening, and a laterally-outer plate, wherein a first portion of the tube extends along a laterally-inner side of the laterally-inner plate, a second portion of the tube bends laterally outward to pass through the additional opening, and a third portion of the tube extends through a space defined between the laterally-inner plate and the laterally-outer plate to enable the first end of the tube to fluidly couple to the fluid source and to enable the threaded portion of the fitting positioned at the second end of the tube to extend rearwardly of the opening in the plate.

11. The work vehicle of claim 7, comprising:
an arm coupled to the chassis, wherein the arm is configured to move relative to the chassis and is configured to support an implement;
wherein the actuator is configured to drive movement of the implement relative to the arm.

12. The work vehicle of claim 11, wherein the tubing assembly comprises:
a hose;
a threaded coupler coupled to the threaded portion of the fitting and to a respective first end of the hose, thereby fluidly coupling the hose to the fluid source;
an arm-mounted tube supported on the arm of the work vehicle and fluidly coupled to the actuator; and
an additional threaded coupler coupled to a respective second end of the hose and a respective first end of the arm-mounted tube, thereby fluidly coupling the actuator to the fluid source.

13. The work vehicle of claim 12, wherein the hose has a u-shaped bend when coupled to the threaded portion of the fitting via the threaded coupler and the arm-mounted tube via the additional threaded coupler.

14. A work vehicle, comprising:
a cab configured to house an operator;
a chassis comprising a tower portion positioned rearward of the cab relative to a forward direction of travel of the work vehicle, wherein the tower portion houses a fluid source;
an arm configured to couple to an implement; and
a tubing assembly configured to provide a fluid from the fluid source to an actuator to adjust a position of the arm, the implement, or both, the tubing assembly comprising:
a tube comprising a first end and a second end, wherein the first end is configured to fluidly couple to the fluid source; and
a fitting positioned at the second end of the tube and extending through an opening in a rearwardly-facing plate of the tower portion of the chassis, wherein the fitting is in engagement with the rearwardly-facing plate of the tower portion of the chassis to block movement of the tube relative to the rearwardly-facing plate of the tower portion of the chassis, and the fitting comprises a threaded portion that extends rearwardly of the opening in the rearwardly-facing plate relative to the forward direction of travel of the work vehicle to facilitate fluidly coupling the tube to a hose;
wherein the tower portion comprises the rearwardly-facing plate, a laterally-inner plate comprising an additional opening, and a laterally-outer plate, and wherein a first portion of the tube extends along a laterally-inner side of the laterally-inner plate, a second portion of the tube bends laterally outward to pass through the additional opening, and a third portion of the tube extends through a space defined between the laterally-inner plate and the laterally-outer plate to enable the tube to fluidly couple to the fluid source and to enable the threaded portion of the fitting to extend rearwardly of the opening in the rearwardly-facing plate.

15. The work vehicle of claim 14, wherein the tower portion houses a motor of the work vehicle, components of an electrical system of the work vehicle, components of a cooling system of the work vehicle, or any combination thereof.

16. The work vehicle of claim 14, wherein the fitting comprises a first radially-expanded portion in engagement with a first side of the rearwardly-facing plate and a second radially-expanded portion in engagement with a second side of the rearwardly-facing plate.

17. The work vehicle of claim 14, wherein the rearwardly-facing plate is oriented at an acute angle relative to a longitudinal axis of the work vehicle, and a central axis of the threaded portion of the fitting extends from the opening rearwardly relative to the forward direction of travel of the work vehicle and upwardly relative to a vertical axis of the work vehicle.

\* \* \* \* \*